United States Patent [19]

Perle

[11] Patent Number: 5,209,252
[45] Date of Patent: May 11, 1993

[54] EARTHQUAKE GAS SHUT-OFF VALVE

[76] Inventor: Cery B. Perle, 11323 Moorpark St., #97, Toluca Lake, Calif. 91602

[21] Appl. No.: 874,695

[22] Filed: Apr. 28, 1992

[51] Int. Cl.$^5$ .............................................. F16K 17/36
[52] U.S. Cl. ........................................................ 137/38
[58] Field of Search .................................. 137/38, 39

[56] References Cited

U.S. PATENT DOCUMENTS

| | | |
|---|---|---|
| 2,215,044 | 9/1940 | Kammerdiner . |
| 2,585,316 | 2/1952 | Hobson . |
| 2,927,532 | 3/1960 | Ferre, Sr. . |
| 3,747,616 | 7/1973 | Lloyd . |
| 3,768,497 | 10/1973 | Mueller . |
| 4,212,313 | 7/1980 | Winters . |
| 4,331,171 | 5/1982 | Novi . |
| 4,485,832 | 12/1984 | Plemmons et al. . |
| 4,565,208 | 1/1986 | Ritchie et al. . |

FOREIGN PATENT DOCUMENTS 54-776  4/1980  Japan ..................................... 137/38

Primary Examiner—Robert G. Nilson
Attorney, Agent, or Firm—Poms, Smith, Lande & Rose

[57] ABSTRACT

A gas shut-off valve is provided for closing off a natural gas pipeline in the event of an earthquake or other seismic disturbance. The valve has an inlet and an outlet aperture communicating with a central chamber, and a valve seat provided between the inlet and the outlet apertures. An annular channel is located above the chamber, and at least one ball rolls along the channel. A guide ramp is provided which allows a ball to leave the channel and fall onto the valve seat during the earthquake, blocking gas flow between the inlet and the outlet apertures. The guide ramp has a concave surface which provides a continuous path for the ball from the channel. The ball has a center of gravity substantially displaced from an initial position over the channel to a second position directly over the valve seat when it has rolled to a crest of the guide ramp under influence of the earthquake. The valve also has a spring biased retraction rod to remove the ball from the valve seat and return it to the channel, and a turbulence screen within the valve chamber to prevent formation of eddy currents within the chamber.

25 Claims, 2 Drawing Sheets

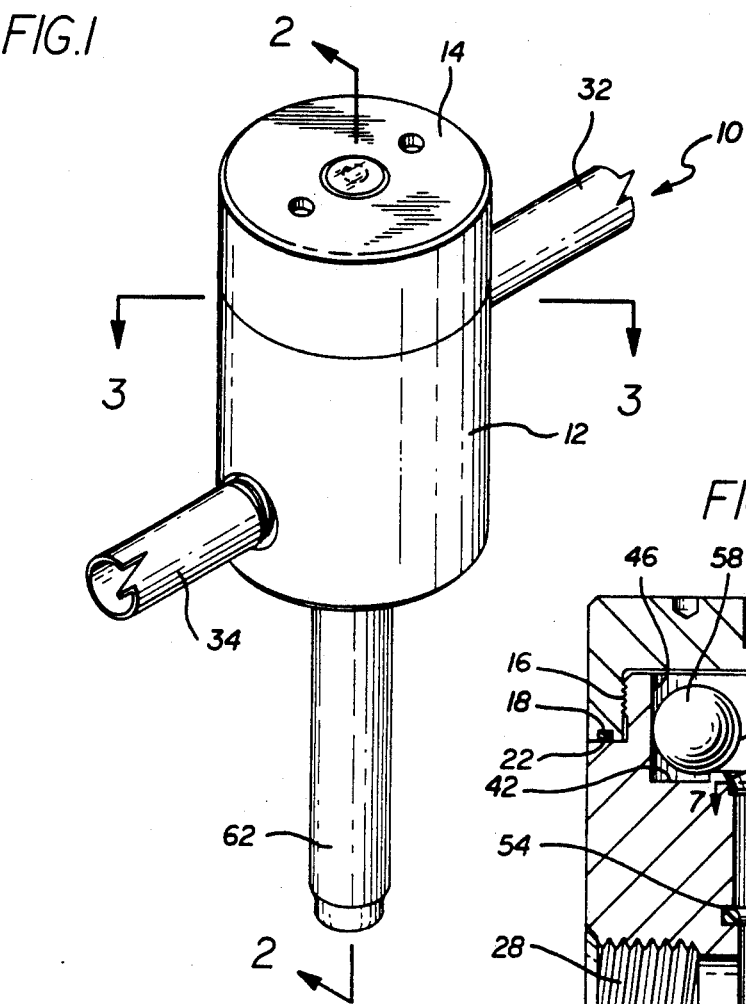
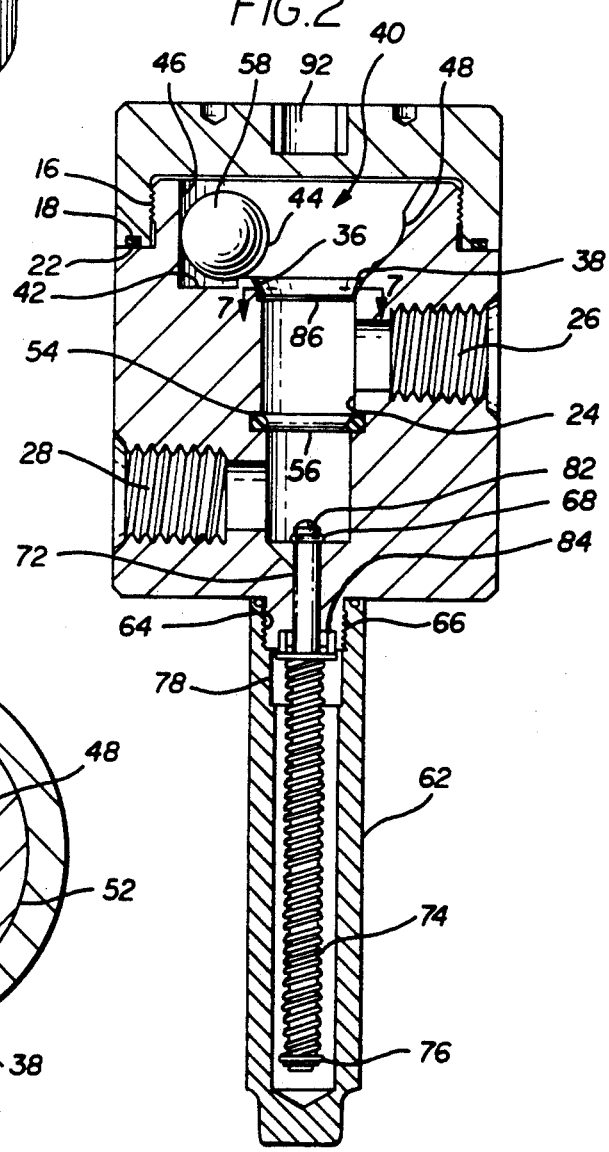
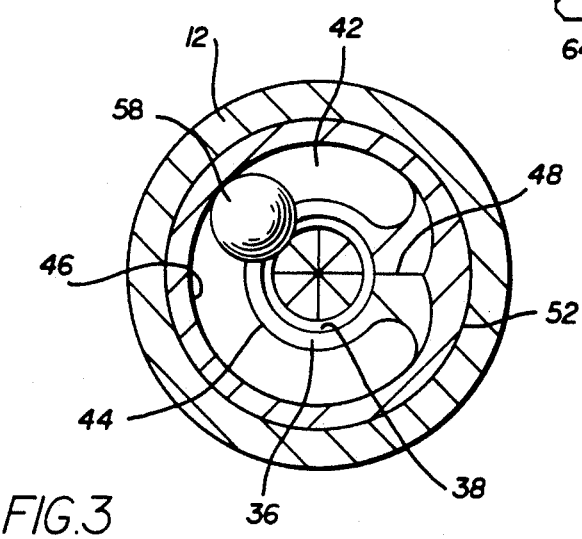

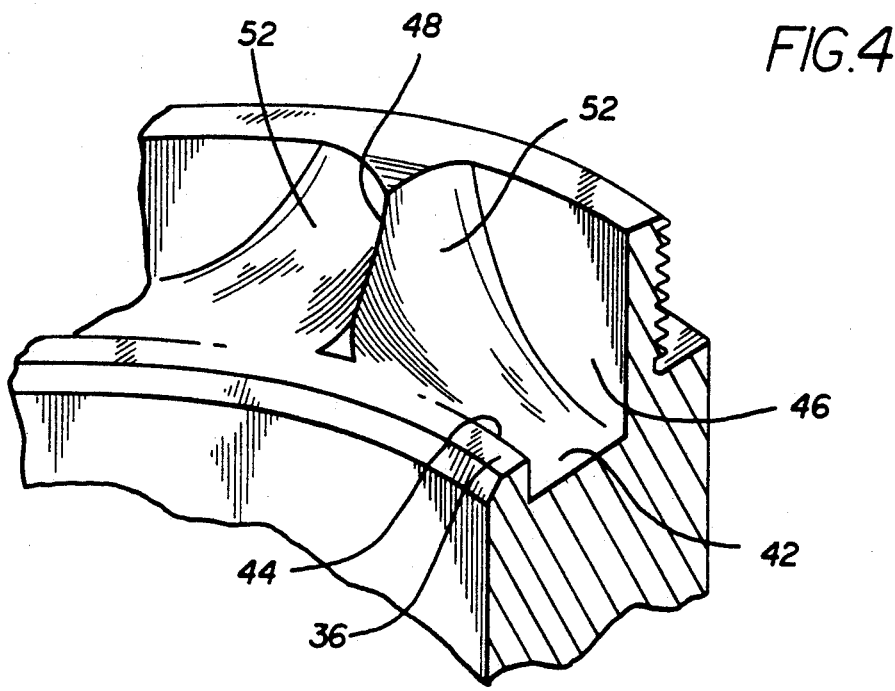
FIG.4
FIG.5
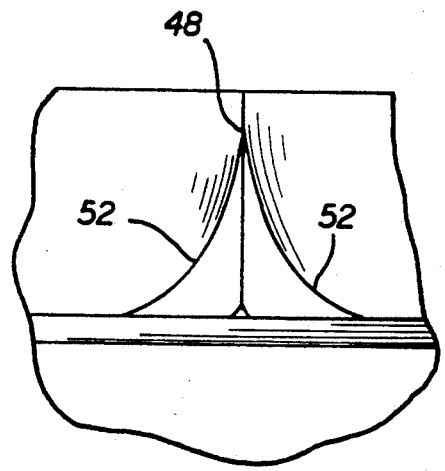
FIG.6
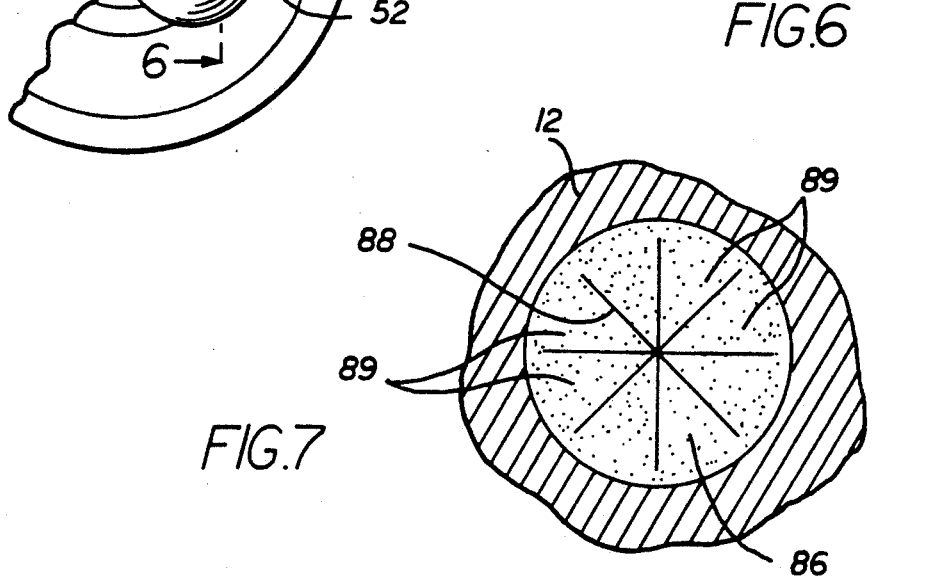
FIG.7

EARTHQUAKE GAS SHUT-OFF VALVE

FIELD OF THE INVENTION

The present invention relates to valves, and more particularly, to an improved gas shut-off valve responsive to earthquakes and other seismic disturbances.

BACKGROUND OF THE INVENTION

Natural gas is increasingly being used as a source of energy by both residential and commercial consumers due to its convenience, cleanliness and efficiency. Natural gas can be used for heating, cooling and cooking, and is quickly replacing oil and coal as the preferred energy source in many parts of the country. An important reason for its growth in popularity lies in the ease of delivery in which gas can be provided to a consumer. Instead of relying on periodic deliveries which can be hindered by inclimate weather, gas is typically piped directly to the consumer. Most new communities are being constructed with the exclusive use of natural gas in mind, by installing extensive gas line networks to serve the current and future residents.

Despite the convenience of natural gas, it also presents a significant danger. Since natural gas is highly flammable, a rupture to the gas lines resulting in gas leakage can cause catastrophic damage to adjacent structures due to fires or explosions. This danger is most acute in areas of the country which experience periodic earthquakes or other seismic disturbances that cause the buried pipelines to rupture. For example, a large percentage of homes destroyed during recent earthquakes in California were consumed by fires started by leakage from ruptured gas lines. Earthquake preparedness experts caution all natural gas consumers to promptly close off all gas lines entering a structure shortly after experiencing an earthquake. By closing off these gas lines, the amount of gas which could leak into the structure can be minimized, and the consequent risk of fire reduced.

Automatic shut-off valves which close off the gas line in response to a seismic disturbance are well known in the art. A common attribute of many such automatic shut off valves is the use of a ball which can be dislodged by a seismic disturbance and which falls into a valve seat position, thereby blocking flow of a gas through the valve structure. Examples of these prior art valves include U.S. Pat. No. 3,747,616, by Lloyd, U.S. Pat. No. 4,212,313, by Winters, and U.S. Pat. No. 4,331,171, by Novi. Each of these patents disclose an initially stationary ball placed upon a pedestal which becomes dislodged from the pedestal by the vibration caused by the seismic disturbance.

These pedestal type valves proved to be unreliable, since virtually any vibration to the valve structure would cause the ball to lodge in the valve seat. Consequently, valves were developed which allowed for limited movement of the ball within the valve structure. Examples of this type of prior art valve include U.S. Pat. No. 4,485 832 by Plemmons et al., and U.S. Pat. No. 4,565,208, by Ritchie et al. These two patents each show valves having a central chamber joined by an inlet and an outlet aperture with a valve sea provided therebetween. A circular track is located above the valve chamber having an obstruction blocking a portion of the track. Upon the track are placed one or more balls which are free to roll along the circumference of the track. Upon the event of a shock or disturbance, a ball can either leave the track and fall directly onto the valve seat, or rebound off the obstruction into the valve seat. Once seated, the ball completely blocks the flow of gas between the inlet and the outlet aperture, effectively closing the valve. Both patents also disclose a resetting mechanism in which a rod extends upward through the valve chamber to dislodge the ball from contact with the valve seat and return it to the initial position on the track.

Although these prior art valves are able to cut off the flow of gas in the event of a seismic disturbance more reliably than the pedestal type valves, they also have several significant drawbacks which render them impractical for ordinary usage. The most significant problem with the prior art valves is unpredictability. The obstruction disposed in the track above the valve chamber of each of the valves essentially comprises a wall which the ball rebounds against. The Plemmons obstruction is more severe, comprising a substantially perpendicular surface relative the floor of the track. A jostling motion effecting the valve and causing the ball to rebound off the wall of the obstruction could cause the ball to either fall into the valve seat or to rebound back along the track. The direction of the rebound would depend more upon the direction of the origin of the seismic disturbance, rather than the size or magnitude of the disturbance.

Similarly, the Ritchie valve has a bell-shaped obstruction. Although more rounded than in the Plemmons obstruction, the vertical component of the Ritchie obstruction is very steep. As in the Plemmons valve, upon striking the obstruction, the direction of rebound of the ball is unpredictable. During ordinary operation, this rebound effect results in a greater number of false alarms, or situations in which the valve is shut-off due to vibrations caused by movement of trucks nearby or other routine disturbances, rather than that caused by a true earthquake. These false alarms significantly inconvenience natural gas consumers, requiring them to be without the resource until a maintenance engineer can reset the valves. In areas of high traffic, the false alarm rate can rise to as much as several false triggers per day.

A secondary problem with the Plemmons and Ritchie valves is that of gas leakage past the resetting mechanism. The hand actuated rod of each prior art valve has a handle or knob which is accessible externally of the valve body, so that an operator can easily return the ball to the initial position. However, by virtue of the fact that the handle extends externally of the valve casing, an opening is provided which enables a path for the leakage of gas.

Both Plemmons and Ritchie attempt to remedy this problem by including O-ring seals surrounding a portion of the rod. These O-rings are intended to provide a seal between the rod and the sleeve which carries the rod. However, dust or other airborne particulate matter can enter the valve body through the handle opening, and settle upon the rod, sleeve and O-ring. The particulate build-up tends to prevent the O-ring from forming a positive seal between the rod and sleeve. This problem is compounded when the rod fails to return fully to the bottom of the valve chamber. With the rod partially extended, the O-ring may not be in a position to form a seal between the rod and the chamber, allowing additional leakage. Without a positive seal between the rod and the sleeve, gas can leak out of the valve chamber. Even trace amounts of gas leakage can present a substantial hazard to a structure. The American National Standards Institute has recognized the severity of this problem, and levied ANSI Z21.70-1981 which requires "pins, stems or other linkage passing through the valve body or casing" to be sealed to provide gastight construction.

An additional problem with the prior art valves is that of gas turbulence within the valve chamber. The high flow rate of gas moving through the valve structure form eddy currents within the valve chamber. Rather than flowing directly between the inlet and outlet apertures, the gas tends to draw upward into the track portion of the valve. The internal turbulence within the valve casing reduces the overall efficiency of the valve, resulting in reduced effective gas line pressure as measured at the outlet aperture. These eddy currents within the valve casing also contribute to the unpredictability of the valve cut-off.

Thus, it would be desirable to provide a gas shut off valve responsive to earthquakes or other seismic disturbances having increased predictability and reliability. It would also be desirable to provide a gas shut-off valve which is fully enclosed so as to prevent any gas leakage, and would satisfy the requirements of the ANSI standard. It would be further desirable to provide a gas shut-off valve having a more efficient flow rate and reduced internal turbulence.

SUMMARY OF THE INVENTION

Accordingly, a principle object of the present invention is to provide a gas shut-off valve having increased reliability. Another object of the present invention is to provide a gas shut-off valve having a fully enclosed structure to prevent any inadvertent gas leakage. Yet another object of the present invention is to provide a gas shut-off valve having reduced internal gas turbulence.

In accomplishing these and other objects, there is provided an earthquake actuated shut-off valve within a valve casing having inlet and outlet apertures communicating with a central chamber and a valve seat located within the central chamber between the inlet and outlet apertures. The valve further comprises a channel located above the valve seat and at least one ball disposed on the channel. The channel further has a guide ramp portion providing a continuous path for the ball from the channel, to a point above the central chamber, enabling the ball to be reliably deposited upon the valve seat in the event of an earthquake or other seismic disturbance. The guide ramp would have substantially concave side surfaces with a radius of curvature greater than that of the ball, and providing an unobstructed path from the channel to a crest of the guide ramp. Upon reaching the crest, the center of the ball would be displaced inwardly relative the valve chamber so that the bulk of the weight of the ball would be out of alignment with the channel and would fall directly to the valve seat.

In an additional embodiment of the present invention, the valve would include a spring biased rod for removing the ball from its position on the valve seat and returning it back to its initial position on the channel. The rod would be normally biased in a downward or sealed position, and can only be raised through intentional manual upward movement. The rod would be further enclosed by a removable sheath which is threadedly attached to the valve casing. To perform the resetting operation, the sheath must be removed from connection with the valve casing. Additionally, O-ring seals are provided on an end of the rod, so that a positive seal is made when the rod is in the spring biased position.

In another embodiment of the present invention, a turbulence screen is disposed within the valve chamber above the inlet aperture. The screen is formed from a flexible metallic or plastic material which normally forms a substantially disk-like surface. Upon the displacement of the ball from the channel in response to a seismic disturbance, the ball would cause the screen to deflect, allowing passage of the ball to the valve seat position. In the normally biased position, the turbulence screen prevents the formation of eddy currents within the valve chamber and increases the efficiency of the gas flow within the valve casing.

A more complete understanding of the gas line shut-off valve of the present invention will be afforded to those skilled in the art as well as a realization of additional advantages and objects thereof, by a consideration of the following Detailed Description of the Preferred Embodiment. Reference will be made to the appended sheets of drawings which will be first described briefly.

BRIEF DESCRIPTION OF THE DRAWING

FIG. 1 is a perspective view of the exterior of the gas shut-off valve, showing gas line intake and exhaust connections;

FIG. 2 is a partial cross-sectional view showing the interior of the valve casing, as taken along section 2—2 of FIG. 1;

FIG. 3 is a partial cross-sectional view showing the ball in an operational position on the channel, as taken along the section 3—3 of FIG. 1;

FIG. 4 is an enlarged, partial perspective view of the channel and guide ramps;

FIG. 5 is a top view of FIG. 4;

FIG. 6 is a sectional view showing the shape of the guide ramps, as taken along section 6—6 of FIG. 5; and FIG. 7 is a partial cross-sectional view showing the turbulence screen, as taken along the section 7—7 of FIG. 2.

DESCRIPTION OF AN EXEMPLARY PREFERRED EMBODIMENT

Referring first to FIG. 1, there is shown an external view of a gas line shut-off valve 10 in accordance with the present invention. The valve 10 has a substantially cylindrical valve casing 12 with a cap 14 threadedly attached to a top portion of the casing. An O-ring seal 22 compresses against a seating flange 22 to provide a gastight seal between the cap 14 and the valve casing 12, as shown in FIG. 2. An inlet tube 32 brings natural gas into the valve casing 12, while an outlet tube 34 channels the gas out of the valve. Extending downwardly from the valve casing 12, is a retractor sheath 62 which covers a retractor rod, which will be further described below.

The cut-away drawings of FIG. 2 and FIG. 3 show the internal details of the valve casing 12. Centrally disposed within the valve casing 12 is a valve chamber 24. Communicating with the chamber 24, is a inlet aperture 26 and an outlet aperture 28. Both the inlet aperture 26 and outlet aperture 28 have threaded portions which enable the engagement with the inlet tube 32 and the outlet tube 34, as commonly known in the art. The valve chamber 24 is substantially cylindrical, having a circular valve seat portion 54 formed by a stepped decrease in diameter of the chamber. The valve seat portion 54 is sized to receive a ball 58 to close the valve, as will be further described below. O-ring 56 is provided on the valve seat 54, to enable a gastight seal between the ball 58 and the valve seat 54.

Above the valve chamber 24, is a channel portion, shown generally at 40 of FIG. 2. The channel portion 40 is a substantially cylindrical space, having an annular channel floor 42. At the upper portion of the chamber 24, the chamber diameter flares outward at a transition between the chamber and the channel portion 40. A raised lip portion 36 surrounds the edge leading to the chamber 24, and has an inner edge 44. An outer surrounding wall 46 defines the outer dimensions of the channel portion 40. The ball 58 has a diameter which is larger than the channel portion's depth, so it contacts the channel portion 40 at two points, a first point at the inner edge 44, and a second point at the surrounding wall 46. The ball 58 is free to roll around the channel's circumference. It should be apparent from FIG. 2 that the center of gravity of the ball 58 when disposed upon the channel substantially remains above the channel floor 42. Although one ball 58 is shown in the figures, it is anticipated that up to three balls be used.

A ramp 50 is provided at one point in the circumference of the channel. The ramp has a pair of curved guides 52 which meet at a crest 48. The guides 52 are substantially concave and provide a continuous and unobstructed path for the ball 58 to travel from the channel. As best shown in FIG. 5, the outer wall 46 transitions smoothly to the curved guide 52. As the ball 58 engages the curved guide 52, the ball's center of gravity moves inwardly relative the chamber 24 until a point in which the center of gravity is no longer over the channel floor 42, but is substantially over the chamber 24. When the ball 58 reaches this point, it will fall into the chamber 24, forming an effective seal by contact with the O-ring 56 and the valve seat 54.

Since the guides 52 provide a continuous curved pathway, the ball 58 will not rebound off the ramp 50. Instead, the ball will continue to roll along the channel and upward relative the guide 52. The operation of the valve 10 depends upon the force and type of the seismic disturbance experienced. A short, jolting disturbance would cause the ball 58 to immediately become dislodged from the channel and fall onto the valve seat 54. However, a rolling type of disturbance would cause the ball 58 to roll around the channel and engage the ramp 50. The ball will either continue up the curvature of the guide 52 until the point is reached in which the center of gravity of the ball is over the chamber 24, or the ball will simply roll back down the curvature. As such, it should be apparent to those skilled in the art that only a disturbance of a predetermined magnitude will cause the ball to roll all the way to the crest 48 of the ramp 50 and fall onto the valve seat 54 within the chamber 24.

To remove the ball 58 from the seated position on valve seat 54, a retracting rod 72 is provided. The rod extends upwardly through a sleeve 73 which extends upwardly from a butt end 66 at the bottom of the valve casing 12 into the chamber 24. The retracting rod 72 has a rounded end 82 which contacts the ball 58. The rod is normally biased in a downward position by a spring 74 which attaches to a lower end of the rod 72 by a retaining clip 76. A pressure plate 78 is provided in the butt end 66 of the housing 12, which surrounds the opening of the sleeve 73, with a grommet 84 between the pressure plate 78 and the sleeve 73. The spring 74 normally applies pressure against the pressure plate 78, holding the rod 72 in the outwardly extended position. An O-ring 68 is also provided surrounding the diameter of the rod 72 adjacent to the end 82. This way, when the rod 72 is in the spring biased position, the O-ring 68 forms an additional seal between the chamber 24 and the sleeve 73.

To insure against any potential gas leakage through the sleeve 73, the retractor sheath 62 provides a gastight seal surrounding the retractor rod 72. The butt end 66 has a threaded portion which engages a similarly threaded portion 64 of the retractor sheath 62. An additional O-ring 75 forms a seal between the retractor sheath 62 and the bottom of the valve casing 12.

Once a ball 58 has lodged in the seated position 54, an operator must first remove the sheath 62 by unscrewing it relative the valve casing 12. After the sheath 62 is removed, the rod 72 can be manually raised against its spring bias to dislodge the ball 58 from the seated position. When the rod 72 has been fully raised relative the valve casing 12, the ball 58 would be forced out of the chamber 24 and fall laterally by cooperation with the flared portion 38 at the upper end of the chamber 24, and ultimately return to engagement with the channel. The operator can then release the push rod 72, whereupon it will return to its biased position, sealing the sleeve 73 and the chamber 24. Then, the sheath 62 can be reattached to the butt end 66 of the valve casing 12, forming a secondary seal against gas leakage.

At the upper portion of the chamber 24, a turbulence screen 86 is provided. The screen 86 extends fully across the chamber 24 above the inlet aperture 26, providing a barrier between the chamber 24 and the channel portion 40. The screen 86 is made of a deformable material, such as metal or plastic, and has a plurality of division slits 88, separating the screen into a plurality of pie-shaped segments 89. The segments 89 normally form a flat, semi-rigid surface, but can be deformed by the passage of the ball 58. It is anticipated that the screen 86 be rigid enough to channel the flow of gas between the inlet aperture 26 and the outlet aperture 28 without allowing the gas to wander into the channel portion 40 or form eddy currents at the upper portion of the chamber 24. However, the screen 86 must be flexible enough to allow the ball 58 to pass through the screen to engage the seated flange 54. In addition, the screen 86 must allow the ball 58 to be passed through the opposite direction during the retraction operation discussed above.

It should be apparent to those skilled in the art that the valve must be installed perfectly level for it to function properly. Accordingly, a bubble float leveling device 92 is provided in the upper lid 14 of the valve 10. The leveling device 92 has a center circle and a floating air bubble. When the valve 10 has been placed in a level position, the air bubble would be seen in the center of the circle.

Having thus described a preferred embodiment of a gas shut-off valve, it should now be apparent to those skilled in the art that the aforestated objects and advantages for the within device have been achieved. It should also be appreciated by those skilled in the art that various modifications, adaptations, and alternative embodiments thereof may be made within the scope and spirit of the present invention which is defined solely by the following claims.

What is claimed is:

1. A gas shut-off valve having inlet and outlet apertures communicating with a central valve chamber and a valve seat provided between said inlet and said outlet apertures, the valve comprising:
   a channel located above said valve chamber;
   at least one ball rolling on said channel;
   a guide ramp causing a ball to leave the channel upon a seismic disturbance of predetermined magnitude, the ball falling onto said valve seat to interrupt gas flow through said valve chamber, the guide ramp comprising a concave surface having a crest, the surface providing a continuous unobstructed path for said ball to roll from said channel, said ball having a center of gravity substantially displaced from an initial position over said channel to a second position directly over the valve seat when said ball has rolled from said channel to said crest turbulence screen disposed within said valve chamber and preventing formation of eddy currents within said chamber.

2. The shut-off valve of claim 1, wherein said guide ramp has a radius of curvature greater than a corresponding radius of said ball.

3. The shut-off valve of claim 2, wherein said guide ramp further comprises a pair of said concave surfaces joined at said crest, said surfaces being accessible to said ball from either a clockwise or counterclockwise direction relative said channel.

4. The shut-off valve of claim 3, further comprising:
   a spring biased retraction rod capable of upward extension against its bias through said valve chamber to remove said ball from contact with said valve seat and return said ball to its initial position on said channel.

5. The shut-off valve of claim 4, further comprising:
   an O-ring disposed circumferentially around an end of said retraction rod, said O-ring sealing said chamber when said rod has returned to its spring biased position.

6. The gas shut-off valve of claim 5, further comprising a sheath fully encapsulating said retraction rod, providing a secondary gas seal for said chamber.

7. The gas shut-off valve of claim 1, wherein said turbulence screen is substantially flat and has a plurality of division slits, said screen normally forming a flat surface channeling said gas through said chamber, said screen further being deformable to allow said ball to pass therethrough.

8. The shut-off valve of claim 1, wherein said screen is disposed between said inlet aperture and said channel.

9. The shut-off valve of claim 1, further comprising a leveling means for installing said valve in an initially level position.

10. The shut-off valve of claim 1, wherein there are a plurality of balls.

11. The shut-off valve of claim 1, wherein there are three balls.

12. A gas shut-off valve having inlet and outlet apertures communicating with a central valve chamber and a valve seat provided between said inlet and said outlet apertures, the valve comprising:
   a channel located above said valve chamber;
   at least one ball rolling on said channel;
   a guide ramp providing a continuous unobstructed path for said ball to roll from said channel, said guide ramp channelling said ball into said chamber and onto said valve seat in response to a seismic disturbance of predetermined magnitude; and
   a spring biased retraction rod capable of manual extension into said chamber to return said ball from contact with said valve seat to said channel, the rod forming a gastight seal when in a spring biased position a turbulence screen disposed within said valve chamber and preventing formation of eddy currents within said chamber.

13. The gas shut-off valve of claim 12, wherein said ball has a center of gravity substantially displaced from an initial position over said channel to a second position over said valve seat when said ball has rolled to a crest of said guide ramp.

14. The shut-off valve of claim 13, wherein said guide ramp has a radius of curvature greater than a corresponding radius of said ball.

15. The shut-off valve of claim 14, wherein said guide ramp further comprises a pair of concave surfaces joined at said crest, said surfaces being accessible to said ball from either a clockwise or counterclockwise direction relative said channel.

16. The shut-off valve of claim 15, further comprising:
   an O-ring disposed circumferentially around an end of said retraction rod, said O-ring sealing said chamber when said rod has returned to its spring biased position.

17. The gas shut-off valve of claim 16, further comprising a sheath fully encapsulating said retraction rod, providing a secondary gas seal for said chamber.

18. The gas shut-off valve of claim 12, wherein said turbulence screen is substantially flat and has a plurality of division slits, said screen normally forming a flat surface channeling said gas through said chamber, said screen further being deformable to allow said ball to pass therethrough.

19. A gas shut-off valve having inlet and outlet apertures communicating with a central valve chamber and a valve seat provided between said inlet and outlet apertures, the valve comprising:
   a channel located above said valve chamber;
   at least one ball riding on said channel, and means for removing said ball from said channel in response to a seismic disturbance of predetermined magnitude, said ball being deposited onto said valve seat upon removal from said channel; and
   a turbulence screen disposed within said valve chamber and preventing formation of eddy currents within said chamber.

20. The gas shut-off valve of claim 19, wherein said turbulence screen is substantially flat and has a plurality of division slits, said screen normally forming a flat surface channeling said gas through said chamber, said screen further being deformable to allow said ball to pass therethrough.

21. The gas shut-off valve of claim 20, wherein said ball has a center of gravity substantially displaced from an initial position over said channel to a second position over said valve seat when said ball has rolled to a crest of said guide ramp.

22. The gas shut-off valve of claim 21, wherein said guide ramp has a radius of curvature greater than a corresponding radius of said ball.

23. The gas shut-off valve of claim 22, wherein said guide ramp further comprises a pair of concave surfaces joined at said crest, said surfaces being accessible to said ball from either a clockwise or counterclockwise direction relative said channel.

24. The gas shut-off valve of claim 19, further comprising:
a spring biased retraction rod capable of manual extension into said chamber to return said ball from contact with said valve seat to said channel, the rod forming a gastight seal when in a spring biased position.

25. The shut-off valve of claim 24, further comprising an O-ring disposed circumferentially around an end of said retraction rod, said O-ring sealing said chamber when said rod has returned to its spring biased position.

* * * * *